INVENTOR.
DONALD K. HAGAR

United States Patent Office 3,551,981
Patented Jan. 5, 1971

3,551,981
METHOD OF SEALINGLY SEATING AN ELONGATED OBJECT IN AN OPENING
Donald K. Hagar, Pittsburgh, Pa., assignor to Gulf Research & Development Company, Pittsburgh, Pa., a corporation of Delaware
Filed Oct. 19, 1967, Ser. No. 676,410
Int. Cl. B21d 53/00; B21k 29/00; B23p 15/26
U.S. Cl. 29—157                                    12 Claims

ABSTRACT OF THE DISCLOSURE

Methods and apparatus for sealing an elongated object in a prepared stepped opening with the use of a pair of nested sealing members, one of which expands by moving with respect to the other to fill the large part of the stepped opening around the object.

---

Figure 1:
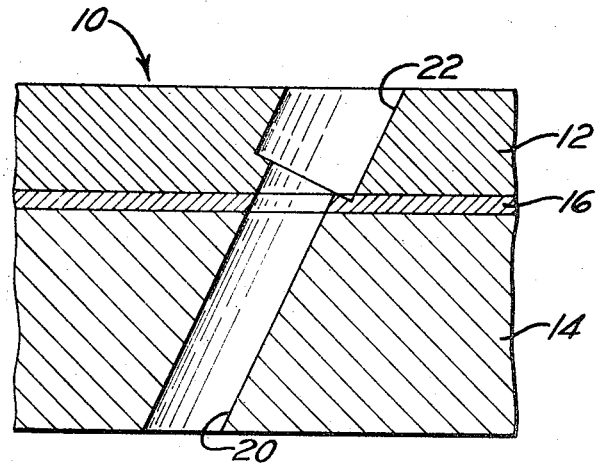

This invention relates to methods and apparatuses for seating an elongated object in a prepared opening in a wall so that it will have a strong resistance to being removed from its seated position when urged in one direction, and yet will be relatively easily removed when urged in the opposite direction.

More particularly, the invention is concerned with sealingly seating an elongated nozzle having a longitudinal passageway in a prepared stepped opening in a drill bit. Heretofore, such nozzles had been seated with the use of epoxy cement and the like. The use of epoxy to seal such nozzles in place is undesirable because it is a relatively expensive fabrication procedure, time consuming, and because it suffers from an undesirable high percentage of faulty seals. Another disadvantage of epoxy sealing is that it is equally resistive to breakage in either direction, making nozzle removal and renewal difficult. Nozzle renewal is important because the nozzles often have a shorter life than the drill bit in which they are mounted because of the inherently abrasive nature of drilling mud. Drilling mud always has at least some sand in it, and this sand or other abrasive materials added to the mud wears the nozzles.

Other problems that arise with epoxy sealing include temperature limitations. The seals will break down above certain temperatures, thereby restricting use of the bit.

Another prior method of sealing such elongated cylindrical nozzles comprises fabricating the outside end of the cylindrical nozzle with a taper, and fabricating the prepared opening with a mating taper. The cooperating tapers on the nozzles and the bits prevented the nozzles from being pushed out. However, this method suffers from the disadvantage that the bit and the nozzle had to be specially fabricated with these tapers. This was particularly difficult to do in some bits since the work had to be done on the outside layer thereof, and this layer is formed of a very hard protective material which is difficult and expensive to specially machine or fabricate. Additionally, replacing nozzles sealed into a bit by this method is costly and time consuming, since the bit must be disassembled in order to get at the inside surface of the nozzle carrying part of the bit.

Other prior methods of sealing nozzles comprise various external sealing and holding means such as O rings, and lock nuts and snap rings. Such external means suffer from the serious disadvantage that they are located in or very near the region of active drilling, and hence are rather quickly eroded, which results in nozzles being pumped out of the bit.

The present invention provides a simple, relatively inexpensive method of sealingly seating elongated objects such as nozzles in a prepared opening in a wall such as a portion of a drill bit which overcomes all of the above disadvantages. The prepared opening is a simple stepped opening having a portion adapted to snugly receive the nozzle, with the enlarged portion being on the inside of the wall, which is formed of a much softer and more manageable material than the very hard outer portion of the wall. In the most usual case where the nozzle is cylindrical in shape, the stepped opening is easily and conveniently fabricated by drilling and then counterboring. If the nozzle or other object has some other cross-sectional shape, such as oval or hexagonal for example, then the stepped opening will have to be prepared by other means, but the enlarged portion will be on the inside, which is usually easier to work.

The invention comprises the use of a pair of tapered members which are formed of selected yield strength materials so that they, or one of them, may be forced to an expanding friction fit between the outside surface of the object or nozzle and the enlarged portion of the stepped opening.

These tapered members may be used whether access to the enlarged portion of the stepped opening is readily obtainable or not. Where access is easy, as when setting an object in a flat wall, the members can be operated with the use of a short length of tubing of appropriate shape and a hammer. Where access is difficult, as in a drill bit or a relatively small pressure vessel, a setting tool and method, wholly operable from the outside is provided. Thus, the nozzles in a drill bit may be renewed without disassembling the bit. The use of this setting tool assures uniform force on each nozzle to hold it in place. One element of the setting tool assembly is destroyed during the setting operation, and by utilizing a known strength in this element, a uniform setting force will be achieved from one nozzle to the next.

One embodiment of the invention comprises the provision of tool marks, ridges, grooves, or other discontinuities of the outside surface of the object, to improve the "grab" or friction grip of the inner setting member on the object. In another embodiment, the invention comprises the use of a pair of setting members formed of materials having melting temperatures considerably lower than the melting temperatures of the nozzle and the drill bit or pressure vessel, whereby the nozzle can be removed by the application of sufficient heat to melt the tapered setting members while not damaging the nozzle or the bit.

Prior methods of sealing usually loosen upon being heated and then cooled. With the present invention, thermal cycling results in a tighter seal in the active direction.

Figure 2:
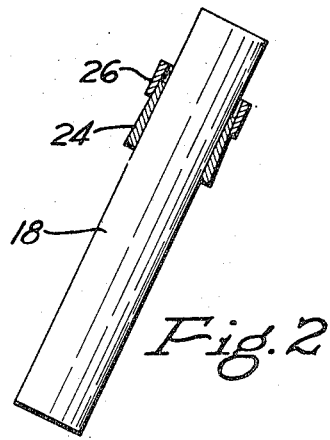
Figure 3:
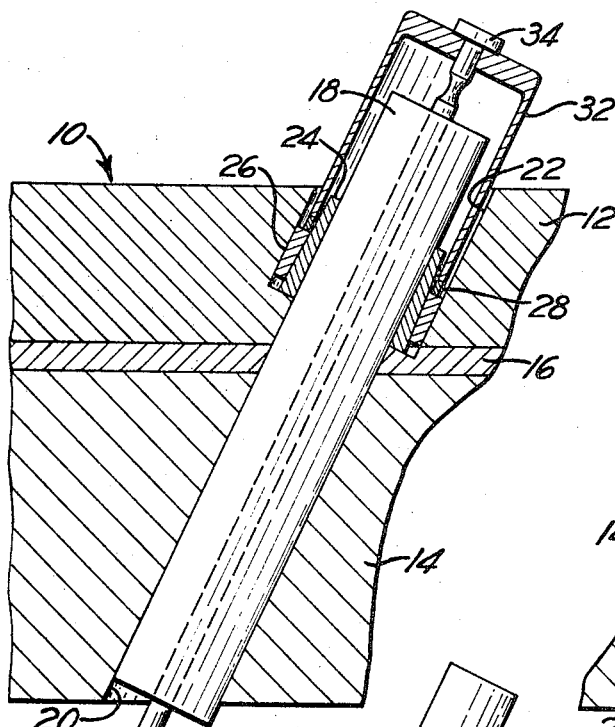
Figure 4:
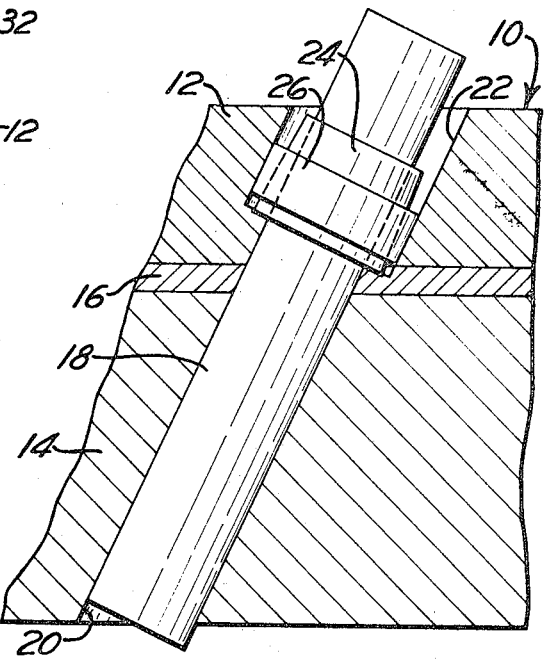
Figure 5:
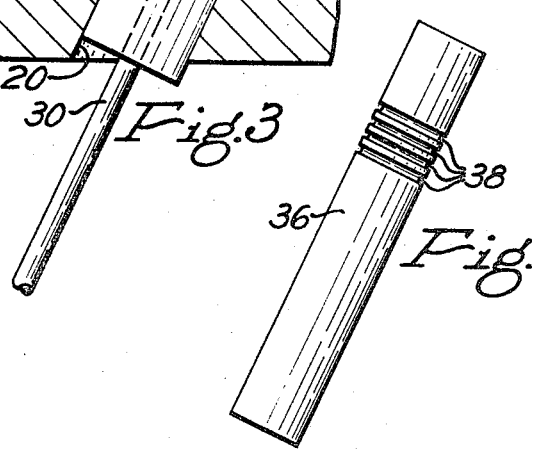

Other advantages of the invention will be pointed out or will become evident in the following detailed description and claims, and in the accompanying drawing in which: FIG. 1 is a somewhat diagrammatic cross-sectional view through the wall of a drill bit showing an opening prepared to receive a nozzle with the sealing means of the invention; FIG. 2 is an external view of a nozzle having the sealing members of the invention mounted thereon in preparation of sealingly seating the nozzle in place; FIG. 3 is a view showing the last step in the method of the invention for sealing a nozzle in place; FIG. 4 is a view similar to FIG. 3 showing the nozzle seated in position; and FIG. 5 is an external view of a nozzle modified according to a second embodiment of the invention.

While the drawing and the accompanying description concern a nozzle of cylindrical shape having a longitudinal opening, it will be understood that the invention may also be used with any elongated object of any cross-sectional shape. The invention can be used to seat objects not having a through passageway, if access can be had to the enlarged portion of the prepared stepped opening that receives the object.

Referring now in detail to the drawing, 10 designates the wall of a hydraulic jet drill bit in which it is desired to mount an elongated, cylindrical nozzle 18. Wall 10 comprises an inner layer 12, an outer layer 14, and an intermediate layer 16.

The invention is shown in the drawings and described below in reference to a hydraulic jet drill bit, but it will be understood that the invention can be used in other drill bits having nozzles, and in many other applications. The invention has particular utility in the bits described because such bits use many nozzles, and the useful life of the nozzles determines the useful life of the bit. A primary advantage of the invention is that it enables renewal of such bits in the field by nozzle replacement, rather than factory renewal of the bits.

Inner layer 12 is formed of steel or the like and serves as the main body of the bit. Outer layer 14 is a protective shield and is formed of a high strength, high abrasion resistance material such as tungsten carbide. The nozzles are also formed of tungsten carbide. Intermediate layer 16 is formed of a suitable material to bind protective layer 14 to inner layer 12.

Wall 10 is formed with a stepped, composite opening which comprises a smaller diameter portion 20 which extends through substantially the entire thickness of wall 10, and an enlarged counterbored portion 22 which extends from the inside surface of inner layer 12 for a predetermined distance into wall 10. The composite opening 20, 22 is easily and inexpensively provided in wall 10 during manufacture of the bit. The angle and location of the nozzle in wall 10 is first determined, and then opening 20 may be drilled all the way through wall 10. The diameter of smaller opening 20 is substantially the same or slightly larger than the outside diameter of nozzle 18. The second and final step in preparation of the opening is the counterbore 22 which is easily accomplished by using opening 20 as a guide and counterboring to the predetermined depth. It is significant that counterbore 22 stops short of the dense, difficult to machine, outer protective layer 14. This desideratum can be obtained by suitable selection of dimensions for the length of the nozzle and the thickness of inner layer 12.

Referring now to FIG. 2, the sealing means of the invention comprises an inner tapered sealing member 24 and an outer tapered sealing member 26. The inside diameter of inner member 24 is such as to sugly receive nozzle 18, and this member is seated on the nozzle before the nozzle is fitted into composite opening 20. 22. The tapers formed on the outside surface of member 24 and the inside surface of member 26 are made equal so that the outer member will move smoothly with respect to the inner member, as will appear more clearly below. An angle in the range of about ½° to about 2° with respect to the axis of the opening in the inner member or of the nozzle has been found to be desirable, with an angle of about 1° being preferred. The outside surface of outer member 26 is cylindrical, and is of a diameter slightly less than the diameter of counterbore 22. Sealing members 24 and 26 are formed of relatively soft metals which preferably have melting points less than that of inner layer 12. In the specific embodiment being described, these members may be formed of copper, tin, Babbitt metal, or the like, or combinations of these metals, i.e., one metal in member 24 and another in member 26. Since the outer member must expand with respect to the inner member, and since the inner member must contract to achieve a fluid tight seal on the nozzle, one important criterion in selecting materials for the members 24 and 26, is that they be materials which have a relatively low yield point.

To set the nozzle in place the inner and outer members are mounted thereon as shown in FIG. 2. Referring to FIG. 3 now, a bearing ring 28 of mild steel or the like, is loosely mounted on the inner end face of outer member 26. This bearing ring serves to protect the outer member 26 from being deformed by pressure thereon from the setting tool, described below, during the nozzle setting operation.

In the following paragraphs, the setting of the nozzle in a difficult access situation, i.e., a narrow necked drill bit is described. In an easy access situation such as a very large necked bit or a flat plate, the following is optional since the rings could be expanded to seal the nozzle or other object in place with simple or even makeshift tools.

After the setting members 24 and 26 are in place as shown in FIG. 2, the nozzle, still outside of the bit in which it is to be mounted, is mounted on a setting wire 30 which carries a setting cup 32. Cup 32 is held on wire 30 by means of a head 34 on the end of the wire which bears against the outside of the cup. The outside diameter of the cup is such as to snugly fit within the counterbore 22, while allowing for expansion of the outer member 26. The thickness of the cylindrical wall of the cup is substantially equal to the radial extent of bearing ring 28, whereby the cup does not contact outer member 26, so as to protect the relatively soft member 26 from direct pressure.

The nozzle, the two setting members, the bearing ring, the cup, and the wire 30 passing through them all form a compact, easily handled assembly. The length of wire 30 is such that it will reach from the neck of the bit, through its length, out composite opening 20, 22, and extend outwardly and beyond sufficiently to provide enough length to be grasped by a suitable pulling tool. Wire 30 is formed of a strong but flexible material such as music wire, and is tempered so as to have a predetermined breaking strength. Using this long length of wire 30, the stepped opening is "fished" for from the neck of the bit and once the end of wire 30 is passed through the composite opening, the nozzle and assembled parts thereon are pulled through the bit and into composite opening 20, 22. Once in place, wire 30 is pulled from the outside of the bit until it breaks. The force applied to the wire is transmitted through the setting cup 32 to the outer setting member 26. Outer member 26 will move with respect to inner member 24 on the mating tapered faces of the two members, expanding to fill the space between the counterbore and the inner member, while inner member 24 is contracted around the nozzle, to seal the nozzle in place with a fluid tight seal. The strength of wire 30 is selected so that at its breaking point the two setting members will be firmly sealed to each other, to the opening, and to the nozzle to hold the nozzle in place. The strength required for wire 30 is determined by geometry and from the pressure or force it is desired to have at the sealing members holding the nozzle in place. After all the nozzles are sealed in place in the bit, it may be simply turned over to remove all the loose setting cups, bearing rings, and broken wire ends, whereupon the bit has been renewed and is ready for future service. The above is the method of renewing a bit at a field location, and is the more difficult situation. To initially set the nozzles in a bit when the bit is being made is an easy access situation since the nozzles can be set before the neck of the bit is put on.

In laboratory tests, plugged nozzles, i.e., solid objects, set according to the invention have been able to withstand very great internal bit pressures, on the order of 6,000 to 13,000 p.s.i. Increased pressure on the inside of the bit will tend to squeeze the setting members tighter into the counterbore 22 and onto the shoulder in the stepped opening, and around the nozzle 18, and this constitutes an additional advantage of the present invention.

These nozzles have been removed by a relatively small force on the outside of the nozzle on the order of 1,500 p.s.i. In fact, a sharp hammer blow on the outside of the nozzle will remove it. It is thought that the nozzle is readily removed because the wall of counterbore 22 is smooth, and the nozzle carries both setting rings 24 and 26 with it when it goes out of the composite opening. The ability to easily remove and renew nozzles in a field location is an important advantage for the present invention. Heretofore it was necessary to carry a large number of complete bits to the field location, because once the nozzles wore, the bit had to be sent to a shop for disassembly and nozzle renewal. With the present invention, only a few drill bits need be carried along with a sufficient supply of much more easily carried nozzles and setting tools.

Referring to FIG. 5, there is shown a nozzle 36, identical to nozzle 18 except for the inclusion of a plurality of circumferential grooves 38 positioned on the outside of the nozzle to be contacted by the inside surface of inner setting member 24. Such grooves or other surface discontinuities serve to increase the friction force between the inner member and the nozzle.

It is noteworthy that a thermal cycling of the seal created by the method and apparatus of this invention does not loosen the seal, but in fact creates a tighter seal of the sealing members around the cylindrical object. Most prior sealing methods that depend on friction, a conventional press-fit for example, usually cannot tolerate a thermal cycling because the seal is thereby loosened or destroyed.

For example, a bit in which the nozzles were sealed according to the invention as described above was heated in an oven at a temperature in the range of about 500° F. to about 600° F., for one hour, a period of time long enough to uniformly heat the entire bit. In most cases this time will be about one hour. The bit was then allowed to cool in still air. After testing, the nozzle sealed without thermal cycling had less resistance to outward motion than the nozzle which had been subjected to the thermal cycling. However, the resistance of the nozzle to be moved inwardly was reduced to about ¾ of the resistance of the uncycled sample. The reduction of this particular strength is unimportant, since the strength remaining is more than sufficient, and since the nozzle does not experience any significant inward forces during normal operation; only the resistance to motion in response to outward forces being critical.

This result is thought to have occurred because of the particular relationships of the thermal coefficients of expansion of the various parts. The nozzle is usually made of a material having a relatively low coefficient of thermal expansion, the sealing members have the highest coefficient of thermal expansion, and inner plate 12 has a coefficient of thermal expansion between that of the nozzle and the sealing members. Upon being heated, the sealing members 24 and 26 tend to expand outwardly and tend to increase both their internal and external diameters. However, counterbore 22 expands more slowly than the sealing members and therefore restrains their expansion. The restraint of the sealing members results in the sealing members contracting and sealing more tightly around the nozzle 18 or 36. The expansion of the nozzle, because of its very low coefficient of thermal expansion is insignificant, but the little expansion it does experience tends to form a still tighter seal between the sealing members and the nozzle. Upon cooling, the sealing rings shrink faster than either the counterbore or the nozzle. Thus, the seal between the sealing rings and the nozzle is tightened and made stronger, while the seal between the sealing rings and the counterbore is decreased slightly.

This additional step of thermal cycling was also tested with sealing rings both made of the same material, namely copper, and it was found that the increase in sealing strength is available both where the materials of the sealing rings are the same and where they are different from each other, so long as the difference in coefficients of thermal expansion of the two materials is not so great that the difference in expansion and contraction resulting will not result in any loosening between the two sealing members. The temperature selected should be less than the annealing or recrystallization temperature of the particular materials used, and the range of 500° F. to 600° F. is generally applicable. Since the rings are work hardened in the process of being sealed in place, it is not desirable to heat them so hot that they will be annealed, resulting in softening and loosening of the seal.

Another method for removing nozzles mounted according to the invention comprises applying heat sufficient to melt the setting members 24 and 26 which will simply flow away and leave the nozzle free to fall out, in either direction. Of course, this alternate embodiment depends on the particular materials used for the wall 10, the nozzle 18, and the setting members, which depends upon the particular usage of the drill bit, pressure vessel, or other device comprising wall 10.

While the invention has been described in detail above, it is to be understood that this detailed description is by way of example only, and the protection granted is to be limited only within the spirit of the invention and the scope of the following claims.

I claim:

1. A method of seating a cylindrical object having a longitudinal through passageway in a stepped opening having a portion of its length having a diameter substantially equal to the diameter of the cylindrical object and the remainder of the length of said opening having a diameter which is a predetermined amount larger than the diameter of the cylindrical object, mounting a pair of partially nested annular sealing members having tapered engaging surfaces on the cylindrical object, threading an elongated wire with a predetermined breaking point strength through a cup-like setting tool and through the longitudinal passageway in the cylindrical object, positioning the annular end face of said cup-like setting tool on an end face of one of said pair of sealing members, inserting said object with the sealing members and setting tool mounted thereon in said opening with an annular flat face of the other of said sealing members seated against a shoulder formed between said two portions of said opening, and pulling said wire to move one of said sealing members with respect to the other sealing member until said wire breaks.

2. A method of mounting an elongated object in an opening having a portion which slidingly snugly fits the object and the remainder of which has a cross-sectional area a predetermined amount larger than the cross-sectional area of the object to provide a space surrounding the object when the object is mounted therein, comprising the steps of mounting a pair of annular partially nested sealing members having tapered engaging surfaces on the object, inserting said object with the sealing members thereon in the opening with a flat annular face of one sealing member seated against a shoulder between the two portions of said opening, placing tubular setting means coaxially with said elongated object against a flat annular face of the other of said sealing members, applying force longitudinally only to said setting means to move said other of said sealing members with respect to said one sealing member that is abutted against said shoulder to cause said sealing members to fill said space surrounding the object and to seal said object in said opening, and removing the setting means from engagement with said other of said sealing members.

3. The method of claim 1, wherein said elongated object comprises a cylindrical nozzle formed with a through passageway and wherein said opening is formed in the wall of a drill bit, said setting means comprising a setting tool, threading the free end of a setting wire through said setting tool and through the longitudinal passageway in the nozzle, threading the free end of said wire through the inside of said drill bit and through said opening, positioning said nozzle with the sealing members and the setting tool thereon in the opening by using the free end of said wire, and moving said one of said sealing members by pulling said free end of said wire.

4. The method of claim 3, said wire having a predetermined breaking point strength, and pulling said wire until said wire breaks, whereby said nozzle may be set in said opening in said drill bit from the outside thereof.

5. The method of claim 3, and inserting bearing means between the end of said setting tool and said other of said sealing members.

6. The method of claim 3, said sealing members comprising inner and outer sealing members having mating tapered surfaces on which they are partially nested, said inner sealing member including said flat annular face adapted to seat against said shoulder in said opening between the two portions of said opening, said sealing member which is moved comprising said outer sealing member, the tapered face of said inner member tapering from said flat annular face thereof inwardly towards the axis of said nozzle and inwardly towards the inside of said drill bit.

7. The method of claim 3, said sealing members being formed of material having less yield strength than said nozzle and the wall of said drill bit.

8. The method of claim 2, and thermally cycling the assembly of said sealing members, said object and the article formed with said opening.

9. The method of claim 8, wherein said thermal cycling is performed by heating said assembly at a temperature in the range of about 500° F. to about 600° F. for about one hour, and then allowing said assembly to cool in still air.

10. The method of claim 2, said sealing members being formed of material having a melting point temperature lower than that of said object and the article in which said opening is formed, whereby said object may be removed from said opening by melting said members.

11. The method of claim 2, said sealing members comprising an outer member and an inner member, the outer face of said inner member and the inner face of said outer member being provided with said engaging tapered surfaces, said sealing members being formed of material having less yield strength than the material of said elongated object and the material in which said opening is formed, the cross-sectional area of said object and said pair of partially nested sealing members being less than the cross-sectional area of said remainder of the length of the opening having said enlarged cross-sectional area when said object with said sealing members are inserted therein, and said sealing member which is moved comprising said outer member which is moved on its tapered face with respect to the tapered face of said inner member.

12. The method of claim 2, and providing discontinuities on the surface of said object at a location on said object to be contacted by one of said sealing members.

References Cited

UNITED STATES PATENTS

| | | | |
|---|---|---|---|
| 611,159 | 9/1898 | Webb | 285—421X |
| 2,950,090 | 8/1960 | Swart | 175—340 |
| 3,242,364 | 3/1966 | Johnson | 285 |
| 3,358,783 | 12/1967 | Raynal et al. | 76—108X |

FOREIGN PATENTS

| | | | |
|---|---|---|---|
| 558,343 | 6/1958 | Canada | 287—114 |

CHARLIE T. MOON, Primary Examiner

U.S. Cl. X.R.

29—525; 175—340; 285—343, 421; 287—114